United States Patent [19]

Seiver et al.

[11] 4,431,747
[45] Feb. 14, 1984

[54] SUPPORTED CARBON-CONTAINING MOLYBDENUM AND TUNGSTEN SULFIDE CATALYSTS, THEIR PREPARATION AND USE

[75] Inventors: Robert L. Seiver, Baton Rouge, La.; Russell R. Chianelli, Sommerville, N.J.

[73] Assignee: Exxon Research and Engineering Co., Florham Park, N.J.

[21] Appl. No.: 400,004

[22] Filed: Jul. 20, 1982

[51] Int. Cl.³ ............... B01J 27/02; B01J 31/12; B01J 27/24; B01J 27/20
[52] U.S. Cl. .................. 502/220; 502/222; 502/162; 502/164; 502/200; 502/174; 423/56
[58] Field of Search ........... 252/431 N, 438, 439, 252/443; 423/56

[56] References Cited

U.S. PATENT DOCUMENTS

| | | | |
|---|---|---|---|
| 2,112,292 | 3/1938 | Jones | 423/53 X |
| 2,490,488 | 12/1949 | Stewart | 260/449.6 |
| 2,686,763 | 8/1954 | Johnson et al. | 252/439 X |
| 3,434,965 | 3/1969 | Joffe | 252/439 X |
| 3,876,755 | 4/1975 | Kurtak et al. | 423/56 |
| 3,997,473 | 12/1976 | Schmit et al. | 252/439 |
| 4,066,530 | 1/1978 | Aldridge et al. | 208/112 |
| 4,098,839 | 7/1978 | Wilms et al. | 252/439 X |
| 4,111,796 | 9/1978 | Yanik et al. | 252/439 X |
| 4,134,825 | 1/1979 | Bearden et al. | 208/108 |
| 4,243,553 | 1/1981 | Naumann et al. | 252/439 |
| 4,243,554 | 1/1981 | Naumann et al. | 252/439 |
| 4,303,634 | 12/1981 | Gatsis | 252/439 X |
| 4,368,141 | 1/1983 | Kukor | 252/439 |

FOREIGN PATENT DOCUMENTS

| | | | |
|---|---|---|---|
| 1473900 | 3/1967 | France | 252/439 |
| 7510059 | 3/1976 | Netherlands | 252/439 |
| 7603197 | 9/1976 | Netherlands | 252/439 |

OTHER PUBLICATIONS

Thermal Decomposition of $(NH_4)_2MoO_2S_2$, T. P. Prasad et al., J. Eng. Chem., 1973, vol. 35, pp. 1845–1904.
Mills & Steffgen, Cat. Rev. 8, 159 (1973).
Noble Metals, Mo & W in Hydrocarbon Synthesis, J. F. Shultz et al., Report 6947, Jul. 1967.
Angrew, Chem. Int. Ed. Engl. 17,279 (1978).

*Primary Examiner*—William G. Wright
*Attorney, Agent, or Firm*—Llewellyn A. Proctor

[57] ABSTRACT

A supported carbon-containing molybdenum sulfide and tungsten sulfide catalyst useful for conducting methanation and hydrotreating reactions, principally the latter, can be formed by compositing a preselected quantity of a porous, refractory inorganic oxide with a complex salt characterized by the formula $$B_x[MO_yS_{4-y}]$$

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and heat decomposing the salt of said catalyst precursor composite in the presence of hydrogen, hydrocarbon and sulfur to form said supported carbon-containing molybdenum sulfide or tungsten sulfide catalyst.

20 Claims, No Drawings

SUPPORTED CARBON-CONTAINING MOLYBDENUM AND TUNGSTEN SULFIDE CATALYSTS, THEIR PREPARATION AND USE

BACKGROUND OF THE INVENTION

(1) Field of the Invention

This invention relates to a process for the preparation of supported carbon-containing molybdenum and tungsten sulfide catalysts, the supported catalyst species prepared by such process, and to the use of such catalysts in methanation or hydrotreating. In particular, it relates to a process for the preparation of a species of highly active, highly selective supported, metal-promoted hydrotreating catalysts, the catalyst species prepared by such process, and the use of such catalyst species in conducting methanation and hydrotreating processes, particularly the latter.

(2) Background and Prior Art

Hydrotreating processes are basic, and very well known to the petroleum refining industry. These processes require the treating with hydrogen of various hydrocarbon fractions, or whole heavy feeds, or feedstocks, in the presence of hydrogenation (hydrogen transfer) catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrofining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrogenation. Carbon yield is reduced, and gasoline yield is generally increased. In the hydrodesulfurization of heavier feedstocks, or residuas, the sulfur compounds are hydrogenated and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residuas, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock which is usually converted to lower molecular weight, or lower boiling components. In the hydrodenitrogenation of relatively heavy feedstocks emphasis is on the removal of nitrogen from the feedstock, which also is converted to lower molecular weight, or lower boiling components. Albeit, hydrodesulfurization and hydrodenitrogenation reactions generally occur together, it is usually far more difficult to achieve effective hydrodenitrogenation of feedstocks than hydrodesulfurization of feedstocks.

The dwindling supplies of high grade petroleum feedstocks necessitates the increased production and processing of transportation fuels from lower grade, heavy petroleum feedstocks and synthetic liquid hydrocarbons derived from hydrocarbon-containing, or precursor hydrocarbon-containing, solids. The refiners' feedstock sources as a result thereof continue to change, particularly as the worldwide supplies of petroleum diminish. The newer feedstocks often contain higher amounts of nitrogen, sulfur, and other materials. Nonetheless, whatever the difficulties, it remains a necessity to effectively hydrotreat the new feedstocks; often to a greater extent than previously was required. It has thus become necessary to process whole heavy petroleum crudes and residua from unconventional sources, as well as synthetic fuels (syncrudes; e.g. liquified coal, oil from coal carbonization, oil from tar sands, shale oil and the like inclusive of residua or viscous syncrude fractions). All, particularly the later, are under active consideration as commercial feedstocks, or feedstock replacements for higher grade petroleum sources. Feedstocks derived from these sources are often of high olefinic content, contain more sulfur or nitrogen, or both, than feedstocks derived from more conventional crude oils.

Naphthas, notably those derived from syncrudes, viz. residua, shale oil, and coal, are highly unsaturated and contain considerably more sulfur, nitrogen, olefins, and condensed ring compounds than the more conventional naphthas. For example, nitrogen and sulfur are contained in cat naphtha in concentrations ranging upwardly from 50 ppm and 1000 ppm, respectively. In coal liquids nitrogen and sulfur are present in concentrations ranging upwardly from 1300 ppm and 5000 ppm, respectively; and oxygen is presently in even higher concentrations. These compounds cause activity suppression and an all too rapid deactivation of the catalysts. Coke formation is increased, and there is more cracking with increased gas production. Albeit these compounds, except for condensed ring naphthenic compounds, can be removed by conventional hydrofining, this is a severe, if not an intolerable process burden due to the large hydrogen consumption; and hydrogen becomes more and more a very expensive commodity. Thus, generally considerably more upgrading is required to obtain usable products from these sources. Such upgrading generally necessitates hydrotreating the various hydrocarbon fractions, or whole crudes, and includes reactions such as hydrogenating to saturate olefins and aromatics, hydrodesulfurizing to remove sulfur compounds, hydrodenitrogenating to remove nitrogen, and conversion of high boiling compounds to lower boiling compounds.

Typical hydrotreating catalysts are exemplified by cobalt molybdate on alumina, nickel molybdate on alumina, cobalt molybdate promoted with nickel, and the like. Certain transition metal sulfides such as cobalt and molybdenum sulfides and mixtures thereof have also been employed in hydrofining processes for upgrading oils which contain sulfur and nitrogen compounds. For example, U.S. Pat. No. 2,914,462 discloses the use of molybdenum sulfide for hydrodesulfurizing gas oil and U.S. Pat. No. 3,148,135 discloses the use of molydenum sulfide for hydrorefining sulfur and nitrogen-containing hydrocarbon oils. U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. A serious disadvantage associated with the use of such catalysts is their relatively high cost, and the supply of catalytic metals is rather limited. Moreover, the reaction rates of such catalysts are relatively slow, particularly in the presence of nitrogen; and hydrogen consumption is quite high. These latter problems are particularly oppressive when it is realized that new generation feeds are unusually high in nitrogen, or sulfur, or both, and the cost of hydrogen is increasing at very high rates.

Molybdenum sulfide is also known to be useful for water gas shift and methanation reactions, as well as for catalyzed hydrotreating operations. Recently, e.g., it was disclosed in U.S. Pat. Nos. 4,243,553 and 4,243,554 that molybdenum disulfide catalysts of relatively high surface area can be obtained by thermally decomposing selected thiomolybdate salts at temperatures ranging from 300°–800° C. in the presence of essentially inert, oxygen-free atmospheres, e.g., atmospheres of reduced pressure, or atmospheres consisting of argon, nitrogen, and hydrogen, or mixtures thereof. In accordance with the former, a substituted ammonium thiomolybdate salt is thermally decomposed at a very slow heating rate of from about 0.5° to 2° C./min, and in accordance with the latter an ammonium thiomolybdate salt is decomposed at a rate in excess of 15° C. per minute to form the high surface area molybdenum disulfide.

There remains a need in the art for new, improved hydrotreating catalysts, especially hydrotreating catalysts which are more highly active, selective, and stable.

It is accordingly a primary objective of the present invention to provide this need, particularly by providing new and improved hydrotreating catalysts, a process for the preparation of these catalysts, and process for the use of these catalysts in conducting hydrotreating reactions.

A particular object is to provide novel hydrogen efficient hydrotreating catalysts which are especially active for the hydrodesulfurization, or hydrodenitrogenation, or both, of hydrocarbon feedstocks which contain relatively high concentrations of sulfur, or nitrogen, or both; as well as a process for the use of such catalysts in conducting such reactions.

A further, and more particular object is to provide novel hydrotreating catalysts of such character which are highly selective for conducting hydrodesulfurization, or hydrodenitrogenation reactions, or both; as well as a process for the use of such catalysts in conducting such reactions.

A yet further, and more specific object is to provide novel methanation catalysts, a process for the preparation of such catalysts, and a process for the use of such catalysts in conducting methanation reactions.

DESCRIPTION OF THE INVENTION

These and other objects are achieved in accordance with the present invention embodying catalysts, and process for producing such supported carbon-containing molybdenum and tungsten sulfide hydrotreating catalysts, both promoted and unpromoted species, which have admirably high activity, selectivity, and stability especially in conducting hydrodesulfurization and hydrodenitrogenation reactions at high levels of hydrogen efficiency with various sulfur and nitrogen containing hydrocarbon feeds. In accordance therewith, a supported carbon-containing molybdenum sulfide and tungsten sulfide hydrotreating catalyst is formed by compositing a preselected quantity of a porous, refractory inorganic oxide with a complex salt characterized by the formula

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and heat decomposing the salt of said catalyst precursor composite in the presence of hydrogen, hydrocarbon and sulfur to form said supported carbon-containing molybdenum sulfide or tungsten sulfide hydrotreating catalyst. Suitably, a solution of the salt, or admixture of salts, is incorporated with a preselected quantity of a porous, refractory inorganic oxide support, preferably a particulate mass of said support, the salt-containing support then preferably dried to remove all or a portion of the solvent from the support, and the dried particulate salt-containing support then heated in the presence of hydrogen, hydrocarbon, and sulfur or a sulfur-bearing compound to the decomposition temperature of said salt, or salts, to form the catalyst species of this invention. Suitably, sufficient of the salt, or salts, is incorporated on the support so that prior to, or at the time the salt, or salts, is decomposed from about 5 percent to about 30 percent, preferably from about 10 percent to about 25 percent of the salt, expressed as weight $MoO_3$ or $WO_3$ on an ignition loss free basis, will be present on the support. The supported catalyst species is stable, highly active and selective as a hydrotreating catalyst. The hydrotreating capacity of such catalysts in a preferred embodiment can be further promoted, and transformed into a yet more effective hydrotreating catalyst by the incorporation therewith of a Group VIII metal or admixture of such metals, of the Periodic Table of the Elements (E. H. Sargent & Co., Copyright 1962, Dyne-Slide Co.).

The precise nature, and composition of the catalyst species that is formed as a reaction product of the decomposition reaction is not known, but it is believed that a catalyst species having the general formula $MS_{2-z}C_{z'}$, wherein M is molybdenum or tungsten, and z and z' are the same or different and range from about 0.01 to about 0.5, is formed, and supported upon the porous, refractory inorganic oxide base. The surface composition, or composition deposited on the surface of the support, is thus believed to correspond generally with the unsupported catalyst species defined in application Ser. Nos. 399,999 and 399,991, each jointly filed by Theresa R. Pecoraro and Russel R. Chianelli, and Russel R. Chianelli and Theresa R. Pecoraro, respectively, of even date herewith; the disclosures of which are herewith incorporated by reference.

The catalyst species of Pecoraro and Chianelli are, like those of Applicants, defined as carbon-containing molybdenum and tungsten sulfides, useful for hydrorefining hydrocarbon feedstocks, and these basic materials can be promoted with transition metal sulfides such as cobalt sulfide. These catalyst species are preformed, or formed in-situ, by contacting a hydrocarbon feed at elevated temperature with one or more catalyst precursors selected from the group consisting of (a) ammonium thiomolybdate or thiotungstate salts, (b) ammonium molybdate or tungsten salts, (c) substituted ammonium thiomolybdate or thiotungstate salts, (d) substituted ammonium molybdate or tungstate salts, and mixtures thereof. Unlike Applicants' catalyst species, however, the catalyst species of Pecoraro and Chianelli are unsupported, bulk catalysts. They thus differ from the supported carbon-containing molybdenum and tungsten catalyst species defined herein; and differ substantially, inter alia, in that the catalyst species of the present invention achieves superior utilization of the catalytic metals present on the catalyst, and better hydrogen utilization.

A starting material for use in the preparation of the catalyst of this invention can, as suggested, be characterized as an organo or hydrocarbyl diammonium ion substituted, an ammonium or quaternary ammonium ion substituted, or an ionic form of a basic cyclic amine substituted thiomolybdate, or thiotungstate, salt having the formula $B_x[MO_yS_{4-y}]$, supra. In such formula B is thus an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is a substituted ammonium or quaternary ammonium ion, or an ionic form of a cyclic amine containing one or more basic N atoms, M is molybdenum or tungsten, preferably molybdenum, and y is 0, or a fraction or whole number ranging up to 3. Preferably y ranges from 0 to 0.5. In the formula the B moiety, or moieties, constitutes a cationic entity, or entities, which forms a complex with an anionic $[MO_yS_{4-y}]^{2-}$ moiety. An organo, or hydrocarbyl diammonium ion moiety thus provides two positive charges in formation of a $B_x[MO_yS_{4-y}]$ salt. On the other hand, two of the substituted ammonium or quaternary ammonium ions, or anionic form of a cyclic amine which contains one or more basic N atoms complex with an anionic $[MO_yS_{4-y}]^{2-}$ moiety. The substituent amino groups of the organo, substituted diammonium ion, or substituted ammonium ion, where B is a substituted diammonium ion or substituted ammonium ion, can be characterized as primary, secondary or tertiary, in that the hydrogen atoms of one or both of the substituent amino groups of B can be substituted or unsubstituted as with an organo, a hydrocarbyl radical or hydrocarbon radical selected from the group consisting of alkyl, aralkyl, cycloalkyl, aryl, alkaryl, alkenyl, and alkynyl, preferably alkyl or aryl, and including such radicals when inertly substituted. Such radical can thus be exemplified by hydrocarbon groups which contain from about one to about 30 carbon atoms, preferably from about one to about 20 carbon atoms. When the hydrocarbyl, or hydrocarbon radical is alkyl, it can typically be methyl, ethyl, n-propyl, iso-propyl, n-butyl, i-butyl, sec-butyl, amyl, octyl, decyl, octadecyl, and the like. When it is aralkyl it can typically be benzyl, beta-phenylethyl, and the like. When it is cycloalkyl, it can typically be cyclopentyl, cyclohexyl, cycloheptyl, cyclooctyl, 2-methyl-cycloheptyl, 3-butyl cyclohexyl, 3-methyl cyclohexyl, and the like. When it is aryl, it can typically be phenyl, ethylphenyl, and the like. When alkaryl, it can typically be tolyl, xylyl, and the like. When alkenyl, it can typically be vinyl, allyl, 1-butenyl, and the like. When it is alkynyl, it can typically be ethynyl, propynyl, butynyl, and the like. The hydrocarbyl, or hydrocarbon radical can be inertly substituted, i.e., it may bear a non-reactive substituent such as alkyl, aryl, cycloalkyl, ether, halogen, nitro, and the like. Typically inertly substituted groups may include 3-chloropropyl, 2-ethoxyethyl, 4-methylcyclohexyl, p-chlorophenyl, p-chloro benzyl, 3-chloro-5-methylphenyl, and the like.

Exemplary of B, i.e., where B is a diammonium ion substitutient of such salts, are the ionic forms of aliphatic diamines; e.g., alkyl diamines such as those derived from straight chain hydrocarbons which contain an amino group on two different carbon atoms, as on each terminal carbon atom, i.e., $H_2N(CH_2)_nNH_2$, where n ranges from 1 to about 30, preferably from 1 to about 20, illustrative of which are methyl diamines, ethylene diamines, n-propyl diamines, hexyl diamines, decyl diamines, dodecyl diamine, and the like, and including aliphatic diamines which contain amino groups on adjacent carbon atoms such as 1,2 bis(amino)-n-butane, or those which contain amino groups on separated carbon atoms such as 1,3 bis(amino)-n-butane, or the like; cyclic diamines, e.g., aromatic diamines, such as those which contain two primary amino groups attached to a fused or non-fused ring structure, e.g., p-diamino benzene, phloroglucinol, o-diamino naphthalene, p-phenylenediamines, and the like. Suitable salts formed from such substitutients are thus exemplified by $[H_3NC_3H_6NH_3][MoO_{0.5}S_{3.5}]$;
$[H_3NC_6H_{12}NH_3][MoO_{0.3}S_{3.7}]$;
$[H_3NC_8H_{16}NH_3][WO_{0.5}S_{3.5}]$;
$[CH_3CHNH_3CHNH_3C_2H_5][MoO_{0.4}S_{3.6}]$;
$[CH_3CHNH_3CH_2CHNH_3C_3H_7][MoO_{0.5}S_{3.5}]$;
$[CH_2CHNH_3CH_2CHNH_3C_3H_7][MoS_4]$;
and the like.

The B moieties of the substituted ammonium thiomolybdate, or thiotungstate salt can, as suggested, also be constituted of ammonium ions wherein one or more of the hydrogen atoms of the ions have been replaced by an organo, hydrocarbyl or hydrocarbon radical, selected from the group consisting of alkyl, aralkyl, cycloalkyl, aryl, alkaryl, alkenyl and alkynyl, including such radicals when inertly substituted. The hydrocarbon moiety is exemplified by hydrocarbon groups which contain from 1 to about 30 carbon atoms, preferably from about one to about 20 carbon atoms. Exemplary of substitutients associated with, or substituted upon the ammonium or quaternary ammonium ion to form each of the two B constituents of the salt are, when the substituent is alkyl, methyl, ethyl, n-propyl, iso-propyl, n-butyl, i-butyl, sec-butyl, amyl, octyl, decyl, octadecyl, and the like; when the substituent is aralkyl, benzyl, betaphenylethyl, and the like; when the substituent is cycloalkyl, cyclopentyl, cyclohexyl, cycloheptyl, cyclooctyl, 2-methylcycloheptyl, 3-butyl cyclohexyl, 3-methyl cyclohexyl, and the like; when the substituent is aryl, phenyl, ethylphenyl, and the like; when the substituent is alkaryl, tolyl, xylyl, and the like; when the substituent is alkenyl, vinyl, allyl, 1-butenyl, and the like; when the substituent is alkynyl, ethynyl, propynyl, butynyl, and the like. The substituent, as suggested, can be inertly substituted, i.e., it may bear a non-reactive substitutent such as alkyl, aryl, cycloalkyl, ether, halogen, nitro, and the like. Typically inertly substituted groups may include 3-chloropropyl, 2-ethoxyethyl, 4-methyl cyclohexyl, p-chlorophenyl, p-chloro benzyl, 3-chloro-5-methylphenyl, etc. Substituted ammonium ions of such types are thus those containing one organo or hydrocarbyl group, e.g., n-$C_4H_9NH_3^+$, $C_6H_5NH_3^+$, and the like, those containing two organo or hydrocarbyl groups, e.g., $(C_2H_5)_2NH_2^+$, $(C_6H_5)_2NH_2^+$, and the like, those containing three organo or hydrocarbyl groups, e.g., $n\text{-}(C_6H_{13})_3NH^+$, $(C_6H_5)_3NH^+$, and the like; and those containing four organo or hydrocarbyl groups, e.g., $(C_6H_5CH_2)_4N^+$, $(C_6H_5)_4N^+$, and the like. Suitable salts useful in the practice of this invention are thus exemplified by $H_3NC_6H_4NH_3[MoO_{0.2}S_{3.8}]$;
$[(C_2H_5)NH_3^+]_2[MoO_{0.4}S_{3.6}]$;
$[(C_6H_5)_2NH_2^+]_2[MoO_{0.4}S_{3.6}]$;
$[(C_6H_5)_2NH_2^+]_2[MoO_{0.1}S_{3.9}]$;
$[(C_6H_{13})_3NH^+]_2[MoO_{0.2}S_{3.8}]$;
$[(C_6H_5)_4N^+]_2[MoO_{0.1}S_{3.9}]$;
$[(C_6H_{13})_4N^+]_2[MoS_4]$; $[(C_6H_5)_4N^+]_2[WS_4]$;
and the like.

The B moieties of the catalyst precursor salt can, as suggested, also be constituted of an ionic form of a cyclic amine which contains one or more basic nitrogen atoms within the ring, generally from one to about three basic atoms in the total molecule. This class of compounds can be constituted of rings having 5, 6, or more members, and can be monocyclic or polycyclic, fused or non-fused rings, non-substituted or inertly substituted, which contain from one to about 3 basic nitrogen atoms in the total molecule. Exemplary of ionic forms of cyclic amines of this character are the ionic forms of such monocyclic five membered rings as pyrrole, isopyrrole, pyrazole, 2-isoimidazole, 1,2,3-triazole and the like; such monocyclic six membered rings as pyridine, pyridazine, pyrimidine, pyrazine, s-triazine and the like; and such fused ring, polyclic structures as indole, 1,5-pyrinidine, quinoline, naphthyridine, purine, acridine and the like. Suitable salts useful in the practice of this invention are thus exemplified by $[C_5H_5NH]_2[MoO_{0.5}S_{3.5}]$; $[C_4H_4N_2H]_2[MoO_{0.5}S_{3.5}]$; $[C_4H_4N_2H]_2[WO_{0.4}S_{3.6}]$; $[C_3H_3N_3H]_2[MoO_{0.2}S_{3.8}]$; $[C_8H_8N_2H]_2[MoO_{0.4}S_{3.6}]$; $[C_{13}H_{13}NH]_2[MoS_4]$ and the like.

The organo or hydrocarbyl diammonium ion substituted, ammonium or quaternary ammonium ion substituted, or ionic form of a basic cyclic amine substituted thiomolybdate, or thiotungstate, salt is preferably impregnated upon a porous, refractory, inorganic, inorganic oxide support, suitably by first dispersing or dissolving said salt, or admixture of salts, in a suitable solvent, and then admixing or slurrying a preselected amount of the precursor thiomolybdate, or thiotungstate, salt solution with a preselected quantity of said support material in particulate form. Virtually, any solvent can be employed which is capable of dissolving the precursor thiomolybdate or thiotungstate salt, without adversely reacting therewith. Albeit, an aqueous solvent can be employed, non aqueous solvents are preferred because few of the organo or hydrocarbyl diammonium ion substituted, ammonium or quaternary ammonium ion substituted, or ionic form of basic cyclic amine substituted thiomolybdate, or thiotungstate, salts are adequately soluble in water. Suitable solvents for dissolving these salts are alcohols, ethers, ketones, paraffins, cycloparaffins and aromatic hydrocarbons, exemplary of which are methyl alcohol, ethyl alcohol, n-propyl alcohol, isopropyl alcohol, n-butyl alcohol, isobutyl alcohol, sec-butyl alcohol, t-butyl alcohol, ethyl ether, tetrahydrofuran, acetone, methyl ethyl ketone, hexane, heptane, cyclobutane, aromatic hydrocarbons, notably those having a single benzene nucleus, especially aromatic hydrocarbons containing from about 6 to about 9 carbon atoms, e.g., benzene, toluene, xylene, n-propyl benzene, isopropyl benzene, and the like; and cycloparaffin hydrocarbons which contain from about 4 to about 9 carbon atoms, e.g., cyclobutane, cyclopentane, cyclohexane, cycloheptane, and the like. Preferred solvents are alcohols, especially the low molecular weight simple alcohols, e.g., methyl alcohol, ethyl alcohol and the like; amines, e.g., butyl amine, ethylenediamine and the like; and ketones, e.g., acetone, methylethyl ketone, and the like.

The organo or hydrocarbyl diammonium ion substituted, ammonium or quanternary ammonium ion substituted, or ionic form of a basic cyclic amine substituted thiomolybdate, or thiotungstate, salt is composited or otherwise intimately associated with the porous, inorganic oxide support by various techniques known to the art, such as coprecipitation, impregnation or the like. The composite is preferably formed from a solution of the desired salt, or salts by impregnation of the support, typically via an "incipient wetness" technique which requires a minimum of solution so that the total solution with the preselected desired amount of the catalyst precursor salt is adsorbed, initially or after some evaporation. Typically, a particulate porous refractory inorganic oxide, notably alumina, in the form of beads, pills, pellets, seived particles, extrudates, or the like in dry or solvated state is contacted with a solution of the salt, or admixture of the salts, with the result that the salt solution is adsorbed into the particulate material in the desired amount. The salt-containing particulate material can thereafter be heated and dried at low temperature, with or without vacuum assistance, e.g., at temperatures ranging at or below the boiling temperature of the solvent.

The preferred support is alumina, and the composite support can contain for example, one or more of alumina, bentonite, clay, diatomaceous earth, zeolite, silica, activated carbon, magnesia, zirconia, thoria, titania and the like, these latter with alumina, usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The catalyst precursor material, or material formed by impregnation of the support with the organo or hydrocarbyl diammonium ion substituted, substituted ammonium or quaternary ammonium ion, or ionic form of a basic cyclic amine salt is preferably dried to remove all or a portion of the solvent, but it is never calcined after the salt is added to the support. The support is preferably dried at a temperature below about 100° C., more preferably between about 50° C. and 80° C., in the presence of nitrogen or oxygen, or both, at static or dynamic conditions, in air or under vacuum. The catalyst precursor material, on a dry basis, contains from about 5 percent to about 30 percent, preferably from about 10 percent to about 25 percent of the undecomposed organo or hydrocarbyl diammonium ion substituted, ammonium or quaternary ammonium ion substituted, or ionic form of a basic cyclic amine substituted thiomolybdate, or thiotungstate, salt, expressed as weight $MoO_3$ or $WO_3$ on an ignition loss free basis.

The catalyst precursor is heated to the decomposition temperature of the impregnating salt, and the salt decomposed in the presence of hydrogen, and a hydrocarbon and sulfur, or sulfur-bearing compound, to form the supported catalyst species of this invention. The nature of the hydrocarbon is not critical, and can generally include any hydrocarbon compound, acyclic or cyclic, saturated or unsaturated, unsubstituted or inertly substituted hydrocarbon. The preferred hydrocarbons are those which are liquid at ordinary temperatures, exemplary of which are such straight chain saturated acyclic hydrocarbons as octane, dodecane, hexadecane, or the like; straight chain unsaturated acyclic hydrocarbons as 2-hexene, 1,4-hexadiene, and the like; branched chain saturated acyclic hydrocarbons, as 3-methyl pentane, neopentane, isohexane, 2,7,8-triethyl decane, and the like; branched chain unsaturated acyclic hydrocarbons such as 3,4-dipropyl-1,3-hexadien-5-yne, 5,5-dimethyl-1-hexene, and the like; cyclic hydrocarbons, saturated or unsaturated, such as cyclohexane, decahydronaphthalene, tetrahydronaphthalene, 2-methyl naphthalene, and the like; and including such aromatics as cumene, mesitylene, styrene, toluene, o-xylene, or the like. The more preferred hydrocarbons are those derived from petroleum, including especially admixtures of petroleum hydrocarbons characterized in virgin naphthas, cracked naphthas, Fischer-Tropsch naphtha, light cat cycle oil, heavy cat cycle oil, and the like, typically those containing from about 5 to about 30 carbon atoms, preferably from about 5 to about 20 carbon atoms and boiling within a range of from about 30° C. to about 450° C., preferably from about 150° C. to about 300° C.

The sulfur, or sulfur-bearing compound is characterized as an organo-sulfur, or hydrocarbyl-sulfur compound which contains one or more carbon-sulfur bonds within the total molecule, and generally includes acyclic or cyclic, saturated or unsaturated, unsubstituted or inertly substituted compounds. Exemplary of acyclic compounds of this character are ethyl sulfide, n-butyl sulfide, n-hexyl thioalcohol, dimethyl disulfide, dimethyl sulfone, dimethyl sulfoxide, and the like; cyclic compounds of such character are methylthiobenzene, methyl dithiobenzene, thiophene, benzothiophene, 5-formamido-benzothiozole, 1-naphthalenesulfonic acid, dibenzylthiophene, and the like. Suitably, the sulfur concentration of the feed ranges from about 0.01 percent to about 10 percent, preferably from about 0.1 to about 2 percent, based on the total weight of the feed. Suitably, both the hydrocarbon and sulfur for the reaction can be supplied by the use of a heterocyclic sulfur compound, or compounds. Exemplary of heterocyclic sulfur compounds suitable for such purpose are thiophene, dibenzothiophene, tetraphenylthiophene, tetramethyldibenzothiophene, tetrahydrodibenzothiophene, thianthrene, titramethylthianthrene, and the like. The hydrogen required for forming the catalysts of this invention may be pure hydrogen, an admixture of gases rich in hydrogen or a compound which will generate in situ hydrogen, e.g., a hydrogen-bearing gas such as hydrogen sulfide, or a hydrogen donor solvent.

In decomposing the catalyst precursor, a bed of the dried catalyst precursor is contacted in a hydrogen atmosphere with the hydrocarbon and sulfur, or sulfur-bearing compound, and heated at conditions which decompose the diammonium ion substituted, ammonium or quaternary ammonium ion substituted, or ionic form of a basic cyclic amine substituted thiomolybdate, or thiotungstate, salt component of said catalyst precursor. For example, a fixed bed of the dried catalyst precursor is charged into a reaction vessel and contacted with a liquid hydrocarbon, or admixture of liquid hydrocarbons, generally at a flow rate of hydrocarbon:catalyst precursor of from about 0.05 to about 50, preferably from about 0.1 to about 10, volumes of hydrocarbon per volume of catalyst per hour, a flow rate of hydrogen ranging from about 250 to about 5000 SCF/Bbl, preferably from about 500 to about 3000 SCF/Bbl, and at pressures ranging from about 50 to about 4000 pounds per square inch gauge (psig), preferably 150 to about 2500 psig. Typically the hydrocarbon is introduced downflow, but can be introduced upflow or downflow over the bed of catalyst precursor, with the organo, or hydrocarbyl sulfur compound being added to the hydrocarbon feed. The organo, or hydrocarbyl sulfur compound is added in sufficient quantity to the feed such that the sulfur content of the feed ranges from about 0.1 percent to about 10 percent, preferably from about 0.5 percent to about 3 percent, calculated as elemental sulfur based on the weight of the hydrocarbon feed. The temperature of the reaction is gradually raised until the decomposition temperature of the organo or hydrocarbyl diammonium ion substituted, ammonium or quaternary ammonium ion substituted, or ionic form of a basic cyclic amine substituted thiomolybdate, or thiotungstate, salt component is reached, at which time the temperature is held substantially constant until the decomposition reaction is completed. Typically the decomposition temperature of the organo or hydrocarbyl diammonium ion substituted, ammonium or quaternary ammonium ion substituted, or ionic form of a basic cyclic amine substituted thiomolybdate, or thiotungstate, salt decomposes generally at peak operating temperatures ranging between about 150° C. and 400° C., more often between about 200° C. and 370° C.

In the preparation of the catalysts of this invention, the salts of the catalyst precursor composite are decomposed in an atmosphere of hydrogen, and in the presence of hydrocarbon and sulfur; the latter species of which can be provided by a sulfur-containing hydrocarbon species, or separately by a hydrocarbon compound, or compounds, and sulfur or a sulfur-containing compound, or compounds. The salts of the catalyst precursor composite decompose at temperatures ranging between about 150° C. and 400° C., and more generally between about 200° C. and 350° C. which temperatures correspond generally with, or are exceeded by hydrotreating temperatures. Where, however, the decomposition temperature of the catalyst precursor is lower than the desired hydrotreating temperature, the temperature in conducting the hydrotreating process is raised to that which is desired for conducting the hydrotreating operation. In a typical operation, hydrotreating conditions are provided as regards hydrogen pressures, space velocities and hydrogen gas recycle rates, and the temperature is gradually raised to the decomposition temperature of the catalyst precursor, the catalyst precursor is decomposed in the presence of the hydrogen, hydrocarbon and sulfur to form the catalytically active species, and the temperature then further increased as desired to conduct the hydrotreating operation. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., or residuum containing from about 10 percent to about 50 percent of a material boiling above about 575° C.

| Feed | | Temp., °C. | Pressure psig | Space Velocity V/V/Hr | Hydrogen Gas Rate SCF/B |
|---|---|---|---|---|---|
| Naptha | Typical | 100–370 | 150–800 | 0.5–10 | 100–2000 |
| | Preferred | 150–260 | 250–400 | 2–6 | 500–1500 |
| Diesel Fuel | Typical | 200–400 | 250–1500 | 0.5–4 | 500–6000 |
| | Preferred | 260–340 | 400–1000 | 1–2 | 1000–2000 |
| Heavy Gas Oil | Typical | 260–430 | 250–2500 | 0.3–2 | 1000–6000 |
| | Preferred | 320–385 | 600–1250 | 0.5–1 | 1500–4000 |
| Residuum | Typical | 340–450 | 1000–5000 | 0.1–1 | 2000–10,000 |
| | Preferred | 360–400 | 1250–2000 | 0.25–0.5 | 4000–6000 |

The catalyst of this invention can be promoted to further dramatically increase the activity of the finished catalyst by the further addition of a Group VIII metal of the Periodic Table of the Elements (E. H. Sargent & Co., Copyright 1962, Dyna-Slide Co.), which metal can be added to the refractory porous inorganic oxide, or alumina, support prior to, simultaneously with, or subsequent to the decomposition of the organo or hydrocarbyl diammonium ion substituted, ammonium or quaternary ammonium ion substituted, or ionic form of a basic cyclic amine substituted thiomolybdate, or thiotungstate, salt on treatment of the catalyst precursor in the presence of hydrogen, hydrocarbon, and sulfur components. Suitably such metal promoter, or metal promoters, particularly iron, cobalt and nickel, alone or in admixture one metal with another, is incorporated with the support, notably alumina, as via cogellation or impregnation prior to incorporation of the organo or hydrocarbyl diammonium ion substituted, ammonium or quaternary ammonium ion substituted, or ionic form of a basic cyclic amine substituted thiomolybdate, or thiotungstate, salt with the dried, calcined support. Preferably, the metal promoter, or metal promoters, is added to the catalyst after the organo or hydrocarbyl diammonium ion substituted, ammonium or quaternary ammonium ion substituted, or ionic form of a basic cyclic amine substituted thiomolybdate, or thiotungstate, salt impregnated upon the support has been treated, and decomposed.

The Group VIII metal components, admixed one component with another or with a third or greater number of metal components, can be composited or intimately associated with the porous inorganic oxide support by impregnation of the support with metals, e.g., with the alumina, by an "incipient wetness" technique, or technique wherein a metal, or metals is contained in a solution, preferably water, alcohol, or ketone in measured amount and the entire solution is absorbed into the support and subsequently dried, and calcined if desired, to form the catalyst. The volume amount of solution to be employed in such recipe is separately determined by measuring the amount of solvent required to wet a known weight of support to the point where some liquid bridging between particles or some miniscus formation between particles and container walls just becomes evident. This ratio of volume of solution to weight of support is then used proportionally to calculate the volume of solution containing catalytic metals to be used in the incipient wetness impregnation. Impregnation by adsorption of the metals from dilute solution onto the support can also be used but this method is more appropriate for low concentrations, e.g., from about 0.01 to about 1.0 percent of catalytic metals desired, and it is less preferable for use in the higher metals concentration ranges. The metal impregnated support, after impregnation, is dried, e.g., at temperatures ranging from about 20° C. to about 150° C., preferably at ambient temperatures, e.g., from about 20° to about 30° C., until free flowing and then from about 80° C. to about 110° C. as in a circulating air, vacuum oven, microwave oven, or the like.

The following examples, with comparative demonstrations, are further exemplary of the highly active, highly selective catalysts of this invention for use in hydrotreating, especially hydrodesulfurization (HDS) or hydrodenitrogenation (HDN), or both. In the examples and demonstrations which follow, all parts are in terms of weight units, pressures in terms of pounds per square inch gauge, temperatures are expressed in terms of degrees Centigrade, gas flow rates in terms of SCF/Bbl, and liquid flow rates in terms of LHSV except as otherwise specified.

EXAMPLE 1

This example demonstrates the advantages of catalysts prepared by the process of this invention, i.e., by decomposing the supported complex salt, $B_x[MO_yS_{4-y}]$, in the presence of hydrogen, hydrocarbon and sulfur to produce a catalyst of high hydrodesulfurization activity, and high hydrodenitrogenation activity. The hydrodesulfurization and hydrodenitrogenation activity of this catalyst is compared with one produced according to the method disclosed and claimed in our copending application Ser. No. 400,005, filed of even date herewith, and with a commercially available hydrodesulfurization catalyst.

A solution was prepared by dissolving 38.628 g of tetrabutylammonium thiomolybdate in enough methanol to give 80 ml of solution. Analysis of the tetrabutylammonium thiomolybdate indicated that it had the approximate formula $((C_4H_9)_4N)_2(MoO_{0.2}S_{3.8}) \cdot 1.7\text{-}H_2O$. A 50 ml portion of this solution was used to impregnate to incipient wetness 50 g of gamma alumina, which had 265.7 m²/g surface area and 0.750 ml/g pore volume, and which had been gound and screened to 14/35 Tyler mesh and calcined 4 hours at 540° C. before impregnation. The alumina was dried overnight in a vacuum desiccator, then impregnated with the remaining 30 ml of solution and dried for 5 hours in a vacuum desiccator. The 88.3 g of impregnated alumina so prepared contained 13.29 weight percent $MoO_3$ on an ignition-loss free basis (ignition loss=38.6%).

Two catalysts, designated A and B, were prepared from this same batch of impregnated alumina. Catalyst A, the catalyst of this invention, was prepared by decomposing the catalyst precursor composite in an atmosphere of hydrogen, hydrocarbon and sulfur whereas Catalyst B was prepared by decomposing the catalyst precursor composite in the presence of hydrogen and hydrogen sulfide, as disclosed and claimed in application Ser. No. 400,005, supra.

In the preparation of catalyst A, the catalyst of this invention, 28.0 g (35 ml) of the impregnated alumina was thermally decomposed in a fixed bed reactor by (1) heating under 500 psig of $H_2$ to 200° C., (2) establishing a liquid feed flow of 0.825 LHSV with a blend of 5% dibenzothiophene (DBT) dissolved in decalin and a gas flow of 900 SCF/B with 100% $H_2$, still at 500 psig, (3) holding 4.5 hours at 200° C., and then (4) heating to 330° C. and holding for 16 hours. The reactor was cooled under hydrogen and discharged in an inert atmosphere, yielding 19.77 g of solids material. The solids material was promoted by impregnating in an inert atmosphere with 2.54 g of cobalt nitrate, dissolved in enough acetone to give 16 ml of solution, and drying overnight in a vacuum desiccator. The finished Catalyst A contained 3.73 weight percent CoO and 14.01 weight percent $MoO_3$, on an ignition-loss free basis (ignition loss=19.5%), and had 183 $m^2/g$ surface area and 0.425 ml/g pore volume.

In the preparation of Catalyst B, 24.2 g (30 ml) of the impregnated alumina was thermally decomposed in a fixed bed reactor by (1) establishing a flow of 15.0 std liters/hr of nitrogen at room temperature and atmospheric pressure, (2) heating to 200° C., (3) switching to a flow of 15.0 std liters/hr of 10 vol.% hydrogen sulfide in hydrogen, at atmospheric pressure, (4) holding at 200° C. for 2 hours, and the (5) heating to 327° C. and hold for 16 hours. The reactor was cooled under nitrogen and discharged in an inert atmosphere yielding 17.6 g of solids material. The solids material was promoted by impregnating in an inert atmosphere with 2.18 g of cobalt nitrate, dissolved in enough acetone to give 14 ml of solution, and drying overnight in a vacuum desiccator. The finished Catalyst B contained 4.24 weight percent CoO and 13.63 weight percent $MoO_3$, on an ignition-loss free basis (ignition loss=15.8%). The catalyst also contained 2.31 wt. % carbon and 5.70 wt. % sulfur, and had 188 $m^2/g$ surface area and 0.492 ml/g pore volume.

The catalytic activity of Catalyst A and B were measured in a side-by-side hydrotreating test, along with a conventional, commercially available cobalt molybdenum catalyst. The conventional catalyst contained 3.22 weight percent CoO and 12.81 weight percent $MoO_3$, and had 239 $m^2/g$ surface area and 0.471 ml/g pore volume. The test feedstock was a Baton Rouge light catalytic cycle oil (LCCO) designated FS-4754. Inspections on this feedstock are given in Table I.

TABLE I

| Feedstock Inspections | | |
|---|---|---|
| Feedstock No. | FS-4754 | FS-5171 |
| API Gravity | 19.3 | 15.6 |
| Sulfur, Wt. % | 1.48 | 1.74 |
| Nitrogen, ppm | 327 | 274 |
| Bromine No. mg/cc | 4.4 | 5.6 |
| Carbon, wt. % | 88.51 | 88.81 |
| Hydrogen, wt. % | 9.98 | 9.42 |
| FIA Aromatics | 71.0 | |
| Olefins | 2.5 | |
| Saturates | 27.0 | |
| Distillation | | |
| 5% | 473 | 465 |
| 50% | 538 | 516 |
| 95% | 634 | 642 |

Hydrotreating conditions were 330° C., 750 psig, and 1200 SCF/B of 100% $H_2$ with space velocities ranging from 0.5 to 2.0 V/H/V. Activity was measured as the reciprocal space velocity required to reach a given desulfurization or denitrogenation target, and relative activities remained constant over the entire range of 85–97% HDS and 62–98% HDN. Per gram of molybdenum, Catalyst A had 1.47 times the desulfurization activity and 1.81 times the denitrogenation activity of the conventional catalyst. Catalyst B had only 0.79 times the desulfurization activity of the conventional catalyst, but had 1.70 times the denitrogenation activity. Thus Catalyst A has much higher HDS activity than either catalyst B or the conventional catalyst (Catalyst B, on the other hand, has a much higher HDN/HDS selectivity.)

These data clearly demonstrate the advantage of carrying out the decomposition of the catalyst precursor composite in the presence of a hydrocarbon and a sulfur-bearing compound, when high HDS activity is desired. It also demonstrates the difference between the catalysts of this invention and otherwise similar but unsupported catalysts of Pecoraro and Chianelli, or Chianelli and Pecoraro, supra, because of the selectivity in the preparation of the catalysts.

EXAMPLE 2

This example demonstrates that a superior catalyst can be prepared from diamines, such as ethylenediamine.

A solution was prepared by dissolving 31.40 g of an ethylenediamine salt of thiomolybdic acid in 70.00 g of ethylenediamine. Analysis of the salt indicated that only one nitrogen of each ethylenediamine moiety was protonated, and that the anion was almost completely sulfided, so that the salt had the approximate formula $(H_2NC_2H_4NH_3)_2(MoS_4)$. To this solution, an 83.5 g portion of the same 14/35 mesh calcined gamma alumina used in Example 1 was slowly added. The mixture was stirred during the alumina addition and for an additional 30 minutes. Excess ethylenediamine was removed by vacuum distillation at 30° C. for 48 hours.

Of the 128.9 g of impregnated alumina so prepared, 29.1 g (35 ml) was thermally decomposed in a fixed bed reactor under the same conditions as employed in Example 1 for the preparation of Catalyst A. The reactor was cooled under hydrogen and discharged in an inert atmosphere, yielding 24.96 g of solids material. The solid material was promoted by impregnating in an inert atmosphere with 2.54 g of cobalt nitrate, dissolved in eough acetone to give 16 ml of solution, and drying overnight in a vacuum desiccator. The finished catalyst, designated C, contains 3.55 weight percent CoO and 14.28 weight percent $MoO_3$, on a ignition-loss free basis (ignition loss=18.46%). It also contained 5.53 wt. % carbon and 5.52 wt. % sulfur, and had 207 $m^2/g$ surface area and 0.492 ml/g pore volume.

The catalytic activity was measured in the same way as for Example 1, except that the hydrogen treat gas rate was increased to 1500 SCF/B. Compared to the same conventional catalyst, this catalyst had 1.28 times the desulfurization activity and 1.88 times the denitrogenation activity, per gram of molybdenum.

EXAMPLE 3

A solution was prepared by dissolving 64.0 g of tetrabutylammonium thiomolybdate in enough methanol to give 160 ml of solution. Analysis of the tetrabutylammonium thiomolybdate indicated that it had the approximate formula $((C_4H_9)_4N)_2(MoO_{0.4}S_{3.6}) \cdot H_2O$. A 90 ml portion of this solution was used to impregnate to incipient wetness 83.5 g of the same 14/35 mesh calcined gamma alumina used in Example 1. The alumina was dried overnight in a vacuum desiccator, then impregnated with the remaining 70 ml of solution and dried for 3 days in a vacuum desiccator.

Of the 142.64 g of impregnated alumina so prepared, 23.2 g (30 ml) was thermally decomposed in a fixed bed reactor by (1) establishing a liquid feed flow of 1.0 LHSV with a blend of 5% DBT dissolved in decalin and a gas flow of 900 SCF/B with 100% $H_2$, at room temperature and 500 psig, (2) heating to 200° C. at 2.5 °/min, (3) holding at 200° C. for 2 hours, (4) heating to 330° C. at about 2 °/min, and (5) holding at 330° C. for 16 hours. The reactor was hydrogen-stripped at atmospheric pressure for 30 minutes, cooled under hydrogen, and discharged in an inert atmosphere, yielding 17.0 g of solids material. Of this material, 16.0 g was promoted by impregnating in an inert atmosphere with 2.30 g of cobalt acetate, dissolved in enough methanol to give 15 ml of solution, and drying overnight in a vacuum desiccator. The finished catalyst, which is designated D, contained 3.30 weight percent CoO and 12.23 weight percent $MoO_3$, on an ingition-loss free basis (ignition loss=13.26%). Catalyst D also contained 5.17 wt. % carbon and 4.33 wt. % sulfur, and had 202 $m^2/g$ surface area and 0.446 ml/g pore volume.

The catalytic activity of Catalyst D was measured in the same way as for Example 1, except that the hydrogen treat gas rate was increased to 1500 SCF/B and the temperature was reduced to 325° C. Catalyst D, with the slightly different decomposition conditions and promoted with cobalt acetate instead of cobalt nitrate, it will be observed was even more active than Catalyst A. It had 2.01 times the desulfurization activity of the conventional catalyst, and 2.40 times the denitrogenation activity, per gram of molybdenum.

The hydrogen content of the feed, liquid product, and off-gas were very carefully measured, and the chemical hydrogen consumption of Catalyst D and the commercial catalyst were determined. Chemical hydrogen consumption is thus usually very closely correlated with nitrogen removal, since carbon-nitrogen bonds are stabilized by adjacent aromatic ring structures and are usually broken only after such aromatic rings have been hydrogenated. It was found that the relationship is more favorable for the catalysts of this invention than for the conventional catalysts. Hydrotreating to 80 ppm nitrogen in the liquid product, Catalyst D thus required only 625 SCF/B hydrogen consumption, while the conventional catalyst required 750 SCF/B. Hydrotreating to 20 ppm nitrogen, the chemical hydrogen consumptions were 725 and 850 SCF/B, respectively. A second conventional catalyst was later tested to check this result, the second conventional catalyst containing higher levels of CoO and $MoO_3$, i.e., 4.08 wt. % and 15.86 wt. %, respectively; and it had 235 $m^2/g$ surface area and 0.480 ml/g pore volume. In spite of the difference in catalytic metals levels, at any given product nitrogen level the hydrogen consumption over the second conventional catalyst was indistinguishable from the consumption over the first conventional catalyst. The accuracy of determination of the hydrogen consumption values is about 30 SCF/B. Thus, the catalyst of this invention can hydrotreat to a given nitrogen target with about a 125 SCF/B savings in hydrogen consumption, this representing considerable cost savings.

EXAMPLE 4.

Nickel promoted versions of the catalyst of this invention, Catalysts E and F, were made as follows: A solution was prepared by dissolving 72.0 g of tetrabutylammonium thiomolybdate in enough methanol to give 180 ml of solution. Analysis of the tetrabutylammonium thiomolybdate indicated that it had the approximate formula $((C_4H_9)_4N)_2(MoO_{0.5}S_{3.5})$. This solution was used to impregnate to incipient wetness a 167.0 g portion of the same 14/35 mesh calcined gamma alumina used in Example 1. The alumina was dried for 3 days in a vacuum desiccator. It was then impregnated with a second solution of 56.0 g of tetrabutylammonium thiomolybdate, having essentially the same analyses, dissolved in enough methanol to give 140 ml of solution, and dried in a vacuum desiccator overnight. The 295.8 g of impregnated alumina so prepared contained 13.96 weight percent $MoO_3$, on an ignition-loss free basis (ignition loss=36.43%).

Two portions of this impregnated alumina, with a combined weight 79.5 g (96 ml) were thermally decomposed in fixed bed reactors at the same conditions described in Example 3. They were discharged in an inert atmosphere and recombined, yielding 54.2 g of material.

Of this thermally decomposed sample, 25.2 g was impregnated with 2.43 g of nickel acetate dissolved in enough methanol to make 22 ml of solution. This material was dried in a vacuum desiccator overnight to give Catalyst E. The finished catalyst contained 2.20 weight percent elemental Ni and 12.00 weight percent $MoO_3$, on an ignition-loss free basis (ignition loss=11.40%). It also contained 3.3 wt. % carbon and an undetermined amount of sulfur.

Another 25.2 g of the thermal decomposed sample was impregnated with 2.84 g of nickel nitrate, also dissolved in enough methanol to make 22 ml of solution. This material was dried in a vacuum desiccator overnight to give Catalyst F. The finished catalyst analyzed 2.30 weight percent Ni and 12.20 weight percent $MoO_3$, on an ignition-loss free basis (ignition loss=12.72%). It also contained 1.90 wt. % carbon.

The catalytic activity of these catalysts were measured in the same way as was the catalyst in Example 3. As is typical for Ni/Mo catalysts, the desulfurization activities were somewhat lower than that of the Co/Mo conventional catalyst, by a factor of 0.72 for Catalyst E and 0.62 for Catalyst F, per gram of molybdenum. However, the denitrogenation activities were quite high, 1.92 times and 1.91 times the activity of the conventional catalyst, for Catalyst E and F, respectively.

EXAMPLE 5

In this example, addition of the promoter compound was performed before thermal decomposition of the amine thiomolybdate compound.

A solution was prepared by dissolving 64.0 g of a typical tetrabutylammonium thiomolybdate prep in enough methanol to give 160 ml of solution. A 90 ml portion of this solution was used to impregnate to incipient wetness 83.5 g of a portion of the same 14/35 mesh calcined gamma alumina used in Example 1. The alumina was dried overnight in a vacuum desiccator, then impregnated with the remaining 70 ml of solution and dried overnight in a vacuum desiccator. The impregnated alumina was then further impregnated, without any intervening treatment, with a solution consisting of 11.63 g of cobalt acetate dissolved in enough methanol to give 70 ml of solution, and dried for 4 days in a vacuum desiccator. The 159.9 g specimen of catalyst precursor so prepared is designated Catalyst G. The specimen contained 3.32 weight percent CoO and 13.73 weight percent $MoO_3$, on an ignition-loss free basis (ignition loss=37.11%). It also contained 20.55 wt. % carbon and an undetermined amount of sulfur.

This specimen was thermally decomposed in the same fixed bed reactor in which the activity test was carried out. Prior to the activity test, a liquid feed flow of 1.0 LHSV with a blend of 5% DBT dissolved in decalin and a gas flow of 900 SCF/B with 100% $H_2$ were established at room temperature and 500 psig. The temperature was increased to 200° C., held there for 2 hours, increased to 330° C., and held there for 16 hours. The DBT/decalin blend flow was discontinued, the reactor cooled to 325° C., pressure increased to 750 psig, and the flow rates for LCCO and hydrogen were established for the activity test. Catalyst G had 0.78 times the desulfurization activity of the conventional catalyst, and 1.69 times the denitrogenation activity, per gram of molybdenum.

EXAMPLE 6

This example is designed to distinguish between the catalysts of the present invention, and catalysts disclosed in U.S. Pat. No. 4,243,553, supra, obtained by thermally decomposing selected thiomolybdate salts in the presence of essentially inert, oxygen-free atmospheres.

Four catalysts, designated H, J, K, and L, were prepared. The preparation of Catalyst H used both thermal decomposition in the presence of a hydrocarbon and a sulfur-bearing compound, in accordance with the present invention, and including promotion with cobalt after decomposition, according to a preferred embodiment of the present invention. The preparation of Catalyst J used the thermal decomposition of this invention, combined with a promotion technique which was disclosed in U.S. Pat. No. 4,243,553, but would be within the scope of the current invention. The preparation of Catalyst K followed the teachings of U.S. Pat. No. 4,243,553 as regards both promotion and decomposition. The fourth preparation, Catalyst L, was decomposed in an inert atmosphere, according to the teachings of U.S. Pat. No. 4,243,553, but promoted after decomposition, according to the preferred embodiment of the current invention.

Preparation of catalysts: Specifically, two preparations of tetrabutylammonium thiomolybdate supported on alumina were made exactly as in Example 5, except as regards the specific physical properties of the alumina, and then combined in a masterbatch to give 309.19 g of impregnated alumina. This alumina had 255.1 m²/g surface area and 0.684 ml/g pore volume, and was also ground and screened to 14/35 Tyler mesh, then calcined 4 hours at 540° C. before impregnation.

Preparation of Catalyst H: Two portions of this impregnated alumina from the masterbatch, with a combined weight of 73.5 g (88 ml), was thermally decomposed in fixed bed reactors at the same conditions described in Example 3. The reactors were discharged in an inert atmosphere and the alumina portions recombined, yielding 47.3 g of solids material. Of this material, 31.66 g was impregnated with a solution of 3.48 g of cobalt acetate dissolved in enough methanol to make 31 ml of solution. This was dried in a vacuum deiccator for 3 days, to provide Catalyst H.

Preparation of Catalyst J: A larger portion of the impregnated alumina from the masterbatch, 149.9 g was impregnated with 16.49 g of cobalt acetate dissolved in enough water to make 150 ml of solution. While still wet, the alumina was treated in a packed bed with a flow of 100 ml/min of 100% hydrogen sulfide for 1.5 hours, then flushed with nitrogen for 10 minutes. The alumina was dried in a vacuum desiccator for 17 days. Half of this alumina was thermally decomposed in fixed bed reactors at the same conditions described in Example 3, yielding 50.9 g of Catalyst J.

Preparation of Catalyst K: The other half of the specimen left over from the preparation of Catalyst J was placed in a fixed bed at atmospheric pressure, with a flow of 50 std liters/hour of nitrogen. It was heated at a rate of 1.5 deg/min to 450° C., held at 450° C. for 2 hours, and cooled under nitrogen. The sample was treated with 25 std liters/hour of 2% oxygen in nitrogen for 1 hour at room temperature, to prevent it from being pyrophoric, and then discharged, yielding 54.1 g of Catalyst K.

Preparation of Catalyst L: A third portion of the original impregnated alumina from the masterbatch, 74.9 g was decomposed under nitrogen at the described conditions, yielding 48.2 g of solids material. Of this, 32.3 g was impregnated with a solution of 3.55 g of cobalt acetate, and dissolved in enough methanol to give 32 ml. of solution. This material was dried in a vacuum desiccator overnight, yielding 36.8 g of Catalyst L.

All four catalysts were tested for catalytic activity in identical side-by-side fixed-bed reactors. No conventional catalyst was included in this test, and the activities are expressed as absolute volumetric rate constants, rather than relative to a standard. The kinetic rate constants are shown in Table II for hydrotreating feedstock FS-4754 (Table I) at 325° C., 750 psig, and 1500 SCF/B, with space velocities ranging from 0.5 to 2.0 V/H/V.

TABLE II

Catalyst Activities After Decomposition Under Inert or Reducing, Sulfur-Bearing Conditions

| Catalyst | Decomposition | Promotion | Sulfur Removal Rate Constant | Nitrogen Removal Rate Constant |
|---|---|---|---|---|
| H | Red/Sulf | After | 0.89/Hr | 1.94/Hr |
| J | Red/Sulf | Before | 0.36 | 1.38 |
| K | Inert | Before | 0.36 | 0.50 |
| L | Inert | After | 0.71 | 0.90 |

These data show that Catalyst H, prepared according to a preferred embodiment of this invention, was far more active for both sulfur and nitrogen removal than Catalyst K, made according to the teachings of U.S. Pat. No. 4,243,553, or Catalyst L, also covered by that patent. Catalyst J, a less preferred embodiment, is not as active, but is clearly a different material from Catalyst K or L, as demonstrated by its unusually high HDN/HDS selectivity 1.38/0.36.

The aforementioned U.S. Patent discloses the use of materials such as Catalyst K in hydrotreating, but it is principally concerned with the use of unpromoted versions in methanation. Therefore, samples of Catalyst H and L, before these materials were promoted, were tested for methanation activity. The test was carried out at 400° C., 400 psig, GHSV=3000, using a feed with $H_2/CO=3$. After 1 hour, the unpromoted version of catalyst H gave 40% conversion of CO to hydrocarbons, while the unpromoted version of Catalyst L gave only 35%. After 20 hours, the conversions were 33% and 29%, respectively. Thus, decomposition of a supported amine thiomolybdate salt in the presence of a hydrocarbon and a sulfur-bearing compound gives a superior catalytic material than decomposition in an inert atmosphere, for methanation as well as for hydrotreating.

EXAMPLE 7

The catalysts of this invention described in previous examples all have molybdenum contents corresponding to an equivalent $MoO_3$ content in the range of 12-14 wt. %, which is very close to the $MoO_3$ content of the conventional catalyst to which they have been compared. However, some commercial catalysts of more recent vintage have higher loadings, often 14-16 wt. % $MoO_3$, and sometimes even up to 20 wt. %. Accordingly, the catalyst described in the folowing example, was prepared with a higher molybdenum content, and a catalyst made in accordance with this invention is compared to such commercial catalyst, specifically the second conventional catalyst described in Example 3, containing 4.08 wt. % CoO and 15.86 wt. % $MoO_3$, and having 235 $m^2/g$ surface area and 0.480 ml/g pore volume.

Preparation of Catalyst M: To make Catalyst M, a solution was prepared by dissolving 84.0 g of tetrabutylammonium thiomolybdate in enough methanol to give 150 ml of solution. Analysis of the tetrabutylammonium thiomolybdate indicated that it had the approximate formula $((C_4H_9)_4N)_2(MoO_{0.8}S_{3.2})$. An 85 ml portion of this solution was used to impregnate 78.5 g of the same calcined 14/35 mesh gamma alumina as used in Example 6. The alumina was dried overnight in a vacuum desiccator, then impregnated with the remaining 65 ml of solution and again dried overnight in a vacuum desiccator.

Of the 160.0 g of impregnated alumina so prepared, three portions, each weighing 46.4-46.6 g (60 ml), were thermally decomposed in fixed bed reactors at the same conditions described in Example 3. Each was discharged in an inert atmosphere, yielding 28.0-28.2 g of material, and was separately impregnated with a solution of 4.35 g of cobalt acetate dissolved in enough methanol to make 28.0 ml of solution, then dried in a vacuum desiccator for three days. The three portions were re-combined to make Catalyst M, with a total yield of 96.99 g. Catalyst M contained 4.64 wt. % CoO and 14.97 wt. % $MoO_3$, on an ignition-loss free basis (ignition loss=10.35%). The catalyst also contained 6.43 wt. % carbon and 5.13 wt. % sulfur, and had 225 $m^2/g$ surface area and 0.410 ml/g pore volume.

The catalytic activity of Catalyst M and the second conventional catalyst were determined side-by-side in the same manner described in Example 3. Catalyst M had 1.38 times the desulfurization activity and 1.94 times the denitrogenation activity, per gram of molybdenum.

EXAMPLE 8

Many of the amine thiomolybdate salts, including tetrabutylammonium thiomolybdate, will melt at a lower temperature than their decomposition temperature. This is desirable, because it allows the salt to wet the porous support and become more highly dispersed as it is being heated for decomposition. It is also desirable because it makes possible the preparation of impregnated materials without any added solvent, as shown in this example.

A mixture was made of 60.13 g of tetrabutylammonium thiomolybdate and 67.69 g of the same 14/35 mesh calcined gamma alumina described in Example 6. Analysis of the tetrabutylammonium thiomolybdate indicated that it had the approximate formula $((C_4H_9)_4N)_2(MoO_{0.2}S_{3.8})$. The mixture was heated and stirred in a Rotovap under a nitrogen blanket for 2 hours at 130° C., then for 2 hours at 180° C., during which time the tetrabutylammonium thiomolybdate melted and impregnated the alumina without any added solvent. This procedure yielded 114.40 g of impregnated alumina which analyzed 16.43 wt. % $MoO_3$ on an ignition-loss free basis (ignition loss=30.54%). It also contained 19.99 wt. % carbon and 7.57 wt. % sulfur.

Three portions of this impregnated alumina, with a combined weight of 109.36 g (105 ml), were thermally decomposed in fixed bed reactors at the same conditions described in Example 3. The specimens were discharged in an inert atmosphere and recombined, yielding 76.93 g of material.

Of this thermally decomposed sample, 38.43 g was impregnated with 4.71 g of cobalt acetate, dissolved in enough methanol to make 38 ml of solution. This material was dried in a vacuum desiccator overnight to give Catalyst N. The finished catalyst contained 4.19 wt. % CoO and 15.76 wt. % $MoO_3$, on an ignition-loss free basis (ignition loss=7.26%). It also contained 5.22 wt. % carbon and 6.30 wt. % sulfur, and had 220 $m^2/g$ surface area and 0.411 ml/g pore volume.

The catalytic activity was measured in the same way as for Example 7, except that a different LCCO feedstock, designated FS-5171, was used. Inspections on this feedstock are listed in Table I. It was found that it makes very little difference whether the tetrabutylammonium thiomolybdate is impregnated onto the alumina from methanol solution or from the thiomolybdate melt. Catalyst N had 1.38 times the desulfurization activity of the newer generation conventional catalyst, and 1.73 times the denitrogenation activity, per gram of molybdenum.

EXAMPLE 9

In Example 5, the catalyst was promoted before the amine thiomolybdate salt was decomposed, and in all other preceding examples, after it was decomposed. In this example, a catalyst was prepared in which the promoter was put onto the gamma alumina even before the amine thiomolybdate salt was impregnated.

Preparation of Catalyst O: A solution was prepared by dissolving 19.64 g of cobalt nitrate in enough water to give 75 ml of solution. This solution was used to impregnate 83.5 g of the 14/35 mesh calcined gamma alumina described in Example 6. The impregnated alumina was left covered at room temperature overnight, then dried for 2 hours in an air oven at 80° C. To more completely remove the water, at a low enough temperature to avoid decomposition of the nitrate, the sample was subjected to azeotropic distillation with 250 ml of toluene at 110° C. for 4 hours, then dried overnight in a vacuum desiccator. Of the resulting 101.36 g of impregnated alumina, 67.69 g was mixed with 60.03 g of tetrabutylammonium thiomolybdate. Analysis of the tetrabutylammonium thiomolybdate indicated that it had the approximate formula $((C_4H_9)_4N)_2(MoO_{0.6}S_{3.4})$. The mixture was heated and stirred in a Rotovap under a nitrogen blanket for 2 hours at 134° C., and then for 2 hours at 183° C., during which time the tetrabutylammonium thiomolybdate melted and impregnated the alumina without any added solvent. Some sintering occurred, and the finished catalyst had to be broken up and re-screened to 14/35 mesh. The finished catalyst, designated Catalyst O, contained 4.25 wt. % CoO and 12.46 wt. % MoO$_3$, or an ignition-loss free basis (ignition loss=31.06%). The catalyst also contained 19.51 wt. % carbon and 7.44 wt. % sulfur, and had 108 m$^2$/g surface area and 0.253 ml/g pore volume.

Catalyst O was thermally decomposed in the same fixed bed reactor in which the activity test was carried out. Prior to the activity test, a liquid feed flow of 1.0 LHSV with a blend of 5% DBT dissolved in decalin and a gas flow of 900 SCF/B with 100% H$_2$ were established at room temperature and 500 psig. The temperature was increased to 200° C., held there for 2 hours, increased to 330° C., and held there for 16 hours. The DBT/decalin blend flow was discontinued, the reactor cooled to 325° C., the pressure increased to 750 psig, and the flow rates for LCCO (FS-5171) and hydrogen were established for the activity test. Per gram of molybdenum, Catalyst O had somewhat low desulfurization activity, 0.71 times that of the second conventional catalyst, but quite high denitrogenation activity, 1.86 times that of the second conventional catalyst.

It is apparent that various modifications and changes can be made without departing the spirit and scope of the present invention.

Having described the invention, what is claimed is:

1. A process for the preparation of supported carbon-containing molybdenum sulfide and tungsten sulfide catalysts which comprises
compositing a preselected quantity of a porous, refractory inorganic oxide with a salt characterized by the formula $$B_x[MO_yS_{4-y}]$$

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and
heat decomposing the salt of said catalyst precursor composite in the presence of hydrogen, hydrocarbon and sulfur to form said supported carbon-containing molybdenum sulfide or tungsten sulfide catalyst.

2. The process of claim 1 wherein the supported carbon-containing molybdenum or tungsten sulfide catalyst precursor composite, prior to decomposition of the salt, contains from about 5 percent to about 30 percent of the salt, calculated as MoO$_3$ or WO$_3$ on an ignition loss free basis.

3. The process of claim 1 wherein the catalyst precursor composite is heated at temperatures ranging from about 150° C. to about 400° C. to heat decompose the salt of said composite.

4. The process of claim 3 wherein the decomposition temperature ranges from about 200° C. to about 370° C.

5. The process of claim 1 wherein the decomposition temperature ranges from about 150° C. to about 400° C., the salt impregnated catalyst precursor composite is contacted with hydrogen at a flow rate ranging from about 250 to about 5000 SCF/Bbl, at pressures ranging from about 50 to about 4000 psia, and with a liquid feed hydrocarbon at a flow rate of hydrocarbon:catalyst precursor of from about 0.05 to about 50 volumes of hydrocarbon per volume of catalyst per hour, and the added sulfur is equivalent to a sulfur content which ranges from about 0.1 to about 10 percent, calculated as elemental sulfur based on the weight of the hydrocarbon feed.

6. The process of claim 5 wherein the flow rate of the hydrogen ranges from about 500 to about 3000 SCF/Bbl, the pressure ranges from about 150 to about 2500 psia, the flow rate of the liquid hydrocarbon ranges from about 0.1 to about 10, and the concentration of sulfur ranges from about 0.5 percent to about 3 percent.

7. The process of claim 1 wherein the porous, refractory inorganic oxide is alumina.

8. The process of claim 1 wherein the porous, refractory inorganic oxide is particulate alumina, the salt is dissolved in a solvent, and the particulate alumina and salt solution are contacted together and the particulate alumina impregnated with the salt solution, the impregnated alumina is dried to remove the solvent, and the dry, salt-impregnated alumina heated to a temperature sufficient to decompose the salt and form said supported carbon-containing molybdenum sulfide or tungsten sulfide catalysts.

9. The process of claim 1 wherein, in the salt characterized by the formula $B_x[MO_yS_{4-y}]$, M is molybdenum and y ranges from 0 to 0.5.

10. The process of claim 1 wherein a Group VIII-B metal, or admixture of said metals, exclusive of said metal added by incorporation of said heat decomposable thiomolybdate or thiotungstate salt, is composited with said supported carbon-containing molybdenum sulfide or tungsten sulfide catalyst.

11. As a composition of matter, supported carbon-containing molybdenum sulfide and tungsten sulfide catalysts formed by the steps comprising
compositing a preselected quantity of a porous, refractory inorganic oxide with a salt characterized by the formula $$B_x[MO_yS_{4-y}]$$

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and
heat decomposing the salt of said catalyst precursor composite in the presence of hydrogen, hydrocarbon and sulfur to form said supported carbon-containing molybdenum sulfide or tungsten sulfide catalyst.

12. The composition of claim 11 wherein the supported carbon-containng molybdenum or tungsten sulfide catalyst precursor composite, prior to decomposition of the salt, contains from about 5 percent to about 30 percent of the salt, calculated as MoO$_3$ or WO$_3$ on an ignition loss free basis.

13. The composition of claim 11 wherein the catalyst precursor composite is heated at temperatures ranging from about 150° C. to about 400° C. to heat decompose the salt of said composite.

14. The composition of claim 13 wherein the decomposition temperature ranges from about 200° C. to about 370° C.

15. The composition of claim 11 wherein the decomposition temperature ranges from about 150° C. to about 400° C., the salt impregnated catalyst precursor composite is contacted with hydrogen at a flow rate ranging from about 250 to about 5000 SCF/Bbl, at pressures ranging from about 50 to about 4000 psia, and with a liquid feed hydrocarbon at a flow rate of hydrocarbon:-catalyst precursor of from about 0.05 to about 50 volumes of hydrocarbon per volume of catalyst per hour, and the added sulfur is equivalent to a sulfur content which ranges from about 0.1 to about 10 percent, calculated as elemental sulfur based on the weight of the hydrocarbon feed.

16. The composition of claim 15 wherein the flow rate of the hydrogen ranges from about 500 to about 3000 SCF/Bbl, the pressure ranges from about 150 to about 2500 psia, the flow rate of the liquid hydrocarbon ranges from about 0.1 to about 10, and the concentration of sulfur ranges from about 0.5 percent to about 3 percent.

17. The composition of claim 11 wherein the porous, refractory inorganic oxide is alumina.

18. The composition of claim 11 wherein the porous, refractory inorganic oxide is particulate alumina, the salt is dissolved in a solvent, and the particulate alumina and salt solution are contacted together and the particulate alumina impregnated with the salt solution, the impregnated alumina is dried to remove the solvent, and the dry, salt-impregnated alumina heated to a temperature sufficient to decompose the salt and form said supported carbon-containing molybdenum sulfide or tungsten sulfide catalysts.

19. The composition of claim 11 wherein, in the salt characterized by the formula $B_x[MO_yS_{4-y}]$, M is molybdenum and y ranges from 0 to 0.5.

20. The composition of claim 11 wherein a Group VIII-B metal, or admixture of said metals, exclusive of said metal added by incorporation of said heat decomposable thiomolybdate or thiotungstate salt, is composited with said supported carbon-containing molybdenum sulfide or tungsten sulfide catalyst.

* * * * *